April 30, 1929.　　　J. SIERRA, JR　　　1,711,102
CIRCULAR SAW PLANE
Filed June 22, 1927
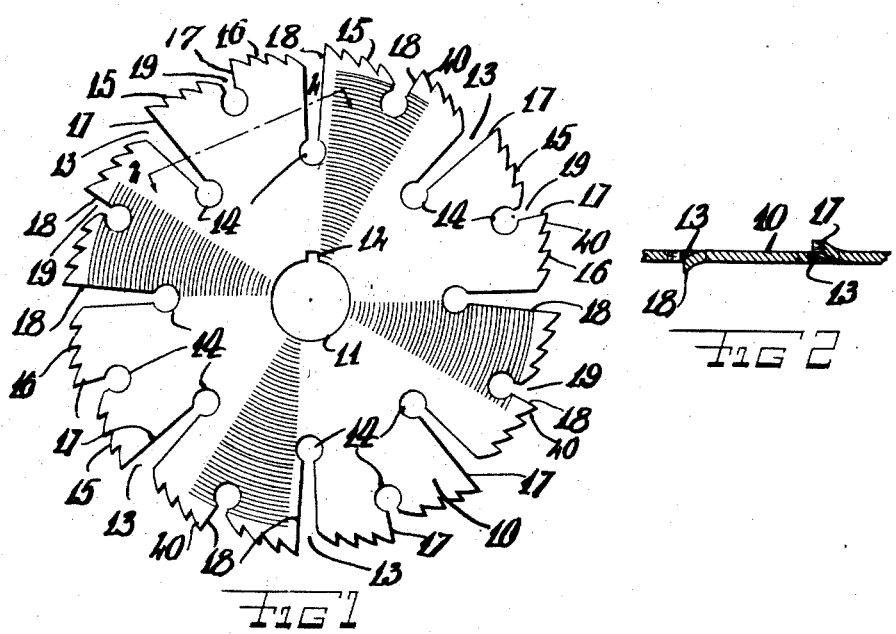
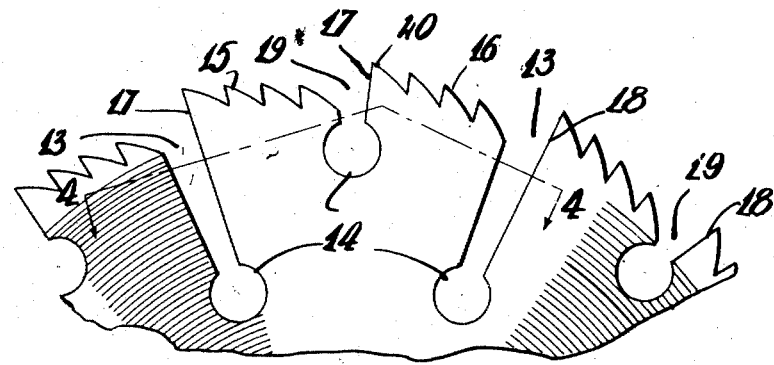
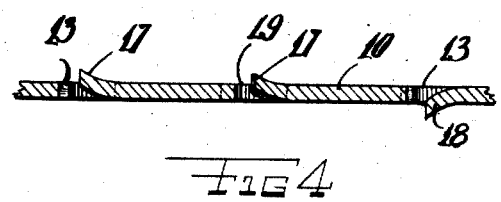
INVENTOR.
Juan Sierra Jr.
BY
ATTORNEY Patented Apr. 30, 1929.

1,711,102

UNITED STATES PATENT OFFICE.

JUAN SIERRA, JR., OF NEW YORK, N. Y.

CIRCULAR-SAW PLANE.

Application filed June 22, 1927. Serial No. 200,517.

This invention relates to a new and useful device in the nature of a circular saw plane particularly adapted for cutting wood, thick cardboard, fibre board, wood composition, such as beaver-board and the like.

The object of the invention is to provide a circular saw plane of novel construction hereinafter more fully described, claimed and illustrated in the accompanying drawing.

Fig. 1 is a side elevational view of my improved circular saw plane.

Fig. 2 is an enlarged fragmentary sectional view taken on the line 2—2 of Fig. 1.

Fig. 3 is an enlarged fragmentary side elevational view illustrating a detailed portion of Fig. 1.

Fig. 4 is a fragmentary sectional view, taken on the line 4—4 of Fig. 3.

As here embodied my improved circular saw plane comprises a disc member 10, having formed therein an axial aperture 11, adapted to slidably receive a saw arbor, not shown in the accompanying drawing. The aperture 11 has a projecting notch 12, formed in the said disc member. The above described construction is such as will permit my improved circular saw to be positioned on the said saw arbor, and securely held in place thereon, by means of an extended element of the saw arbor, adapted to engage the notch 12, so as to permit my improved circular saw to be rotated when the saw arbor is rotated. It should be understood that the saw arbor is of usual construction, such as generally employed as a means of mounting my improved circular saw in the usual saw machine, not shown in the accompanying drawing.

The disc member 10 has formed therein radial slots 13, extending approximately midway, relative to the periphery of the disc member 10, and the axial aperture 11, the radial slots 13 terminating in circular apertures 14. The periphery of the disc member 10 is formed or shaped, as at 15, and is provided with teeth, such as are common to circular saws, intermediate the radial slots 13, so as to provide outwardly protruding edges 16, adjacent to the cutting edges 17 and 18, the cutting edges 17 and 18, being extended at the side of the disc member 10, alternately oppositely extended therefrom, as clearly shown in Fig. 2.

The above described construction is such as will permit the cutting edges 17 and 18, when the disc member 10 is rotated to cut a piece of wood or the like, so as to provide or to leave a smooth, clean cut as the edges of the saw cut in the said piece of wood.

I have shown additional radial slots 19, formed in the disc member 10, similar to the above mentioned radial slots 13, positioned intermediate the said slots 13, extending only slightly inwardly from the periphery of the disc member 10. Each of the cutting edges 17 and 18 formed in the slots 13 and 19 are provided with an outwardly protruding cutting edge 20; said edge 20 is formed at right angles to its respective cutting edges 17 and 18. It should be understood that the outermost portions of the cutting edges 17 and 18 are required to cut a greater quantity of wood fiber than the innermost portions thereof because of the longer path thru which the outermost portions are required to travel. The cutting edges 20 formed on the slots 19 are on the outer portion of the disc and thus aid the outer portion of the cutting edges 17 and 18 in cutting the fiber. It should be also understood that the cooperation between the cutting edges 20 and the outer portions of the cutting edges 17 and 18 which are required to do the greatest amount of cutting, prevent these said parts from becoming dulled before the inner portions thereof.

Having thus described my invention, what I claim as new and desire to protect by Letters Patent of the United States is as follows:

1. A circular saw plane of the class described comprising a disc having a series of spaced apart radially disposed slots therein extending from the periphery of said disc substantially to a point midway between said periphery and the center of said disc, oppositely disposed outwardly directed portions at one edge of each of the slots having a cutting edge thereon adapted to plane the adjacent surface of an incision formed by said saw plane, a second series of radially disposed slots extending from the periphery of the disc inwardly towards the center of said disc to a distance of one-half the distance of the first mentioned slots, each of the slots of the second series formed midway in the periphery of the disc between a pair of the first mentioned slots, and each of the said second series of slots formed with a cutting edge adapted to cooperate with the cutting edges of the first mentioned slots as and for the purpose set forth.

2. A circular saw plane of the class described comprising a disc having a series of spaced apart radially disposed slots therein extending from the periphery of said disc substantially to a point midway between said periphery and the center of said disc, oppositely disposed outwardly directed portions at one edge of each of the slots having a cutting edge thereon adapted to plane the adjacent surface of an incision formed by said saw plane, a second series of radially disposed slots extending from the periphery of the disc inwardly towards the center of said disc to a distance of one-half the distance of the first mentioned slots, each of the slots of the second series formed midway in the periphery of the disc between a pair of the first mentioned slots, each of the said second series of slots formed with a cutting edge extending in a plane parallel with the cutting edge of the first mentioned slot and an incision cutting edge formed adjacent each of the slots of both series and at right angles to the respective cutting edges of said slots as and for the purpose set forth.

In testimony whereof I have affixed my signature.

JUAN SIERRA, Jr.